US012002612B2

(12) United States Patent
Kobayashi et al.

(10) Patent No.: US 12,002,612 B2
(45) Date of Patent: Jun. 4, 2024

(54) REACTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takehito Kobayashi, Mie (JP); Kohei Yoshikawa, Mie (JP); Takashi Misaki, Mie (JP); Seiji Shitama, Mie (JP); Kazuhiro Inaba, Mie (JP); Naotoshi Furukawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 545 days.

(21) Appl. No.: 17/292,899

(22) PCT Filed: Nov. 8, 2019

(86) PCT No.: PCT/JP2019/044004
§ 371 (c)(1),
(2) Date: May 11, 2021

(87) PCT Pub. No.: WO2020/100772
PCT Pub. Date: May 22, 2020

(65) Prior Publication Data
US 2021/0407723 A1 Dec. 30, 2021

(30) Foreign Application Priority Data
Nov. 15, 2018 (JP) ................................ 2018-214504

(51) Int. Cl.
*H01F 27/02* (2006.01)
*H01F 27/24* (2006.01)
*H01F 27/28* (2006.01)

(52) U.S. Cl.
CPC ............ *H01F 27/02* (2013.01); *H01F 27/24* (2013.01); *H01F 27/28* (2013.01)

(58) Field of Classification Search
CPC ........................................................ H01F 27/28
(Continued)

(56) References Cited

U.S. PATENT DOCUMENTS 3,007,125 A * 10/1961 Furbee .................... H01F 30/10 336/212
3,668,586 A * 6/1972 Horbach ............... H01F 27/263 336/210
(Continued)

FOREIGN PATENT DOCUMENTS

JP H11-238629 A 8/1999
JP H11-297540 A 10/1999
(Continued)

OTHER PUBLICATIONS

International Search Report dated Feb. 4, 2020 for WO 2020/100772 A1 (6 pages).

*Primary Examiner* — Ronald Hinson
(74) *Attorney, Agent, or Firm* — Venjuris, P.C.

(57) ABSTRACT

A reactor includes an assembly formed by assembling a coil and a magnetic core, a case for accommodating the assembly inside, a grip member for sandwiching the assembly from the bottom plate portion side and the opening side inside the case, and a screw member for fixing the grip member to the bottom plate portion by penetrating into the case from outside of the bottom plate portion. The grip member includes a first piece to be held in contact with a surface of the assembly on the opening side, a second piece to be held
(Continued)

in contact with a surface of the assembly on the bottom plate portion side, and a third piece connecting the first piece and the second piece in a depth direction of the case.

19 Claims, 9 Drawing Sheets

(58) Field of Classification Search
USPC ........................................................ 336/90
See application file for complete search history.

(56) References Cited

U.S. PATENT DOCUMENTS

| | | | | |
|---|---|---|---|---|
| 4,352,080 | A * | 9/1982 | Mitsui | H01F 17/04 336/83 |
| 4,549,158 | A * | 10/1985 | Mitsui | H01F 17/043 336/83 |
| 5,028,904 | A * | 7/1991 | Kurano | H01F 27/022 336/205 |
| 5,831,505 | A * | 11/1998 | Yamaguchi | H01F 27/255 336/212 |
| 10,395,815 | B2 * | 8/2019 | Yang | H01F 27/306 |
| 2015/0170819 | A1 * | 6/2015 | Yamashima | H01F 27/22 336/61 |
| 2019/0013144 | A1 * | 1/2019 | Inaba | H01F 27/402 |
| 2019/0148051 | A1 * | 5/2019 | Ruther | H01F 27/06 336/198 |

FOREIGN PATENT DOCUMENTS

| | | | |
|---|---|---|---|
| JP | 2000-150250 | A | 5/2000 |
| JP | 2016-066750 | A | 4/2016 |
| JP | 2017-098426 | A | 6/2017 |
| WO | 2017/014160 | A1 | 1/2017 |
| WO | 2018/193854 | A1 | 10/2018 |

* cited by examiner

REACTOR

CROSS REFERENCE TO RELATED APPLICATIONS

This application is a national phase of PCT application No. PCT/JP2019/044004, filed on 8 Nov. 2019, which claims priority from Japanese patent application No. 2018-214504, filed on 15 Nov. 2018, all of which are incorporated herein by reference.

TECHNICAL FIELD

The present disclosure relates to a reactor.

BACKGROUND

For example, Patent Document 1 discloses a reactor provided with a coil including a pair of winding portions formed by winding a winding wire and a magnetic core for forming a closed magnetic path, and used as a constituent component of a converter of a hybrid vehicle or the like. In this reactor, an assembly formed by assembling the coil, the magnetic core and an end surface interposed member is accommodated in a case. The end surface interposed member is a holding member interposed between an end surface of the coil and the magnetic core to hold the coil and the magnetic core.

PRIOR ART DOCUMENT

Patent Document

Patent Document 1: JP 2017-135258 A

SUMMARY OF THE INVENTION

Problems to be Solved

A reactor of the present disclosure includes an assembly formed by assembling a coil and a magnetic core, the magnetic core including an inner core portion to be arranged inside the coil and an outer core portion to be arranged outside the coil, a case for accommodating the assembly inside, the case including a bottom plate portion, the assembly being placed on the bottom plate portion, a side wall portion for surrounding an outer periphery of the assembly and an opening, a grip member for sandwiching the assembly from the bottom plate portion side and the opening side inside the case, and a screw member for fixing the grip member to the bottom plate portion by penetrating into the case from outside of the bottom plate portion, the grip member including a first piece to be held in contact with a surface of the assembly on the opening side, a second piece to be held in contact with a surface of the assembly on the bottom plate portion side, and a third piece connecting the first piece and the second piece in a depth direction of the case.

DETAILED DESCRIPTION TO EXECUTE THE INVENTION

Technical Problem

Figure 1:
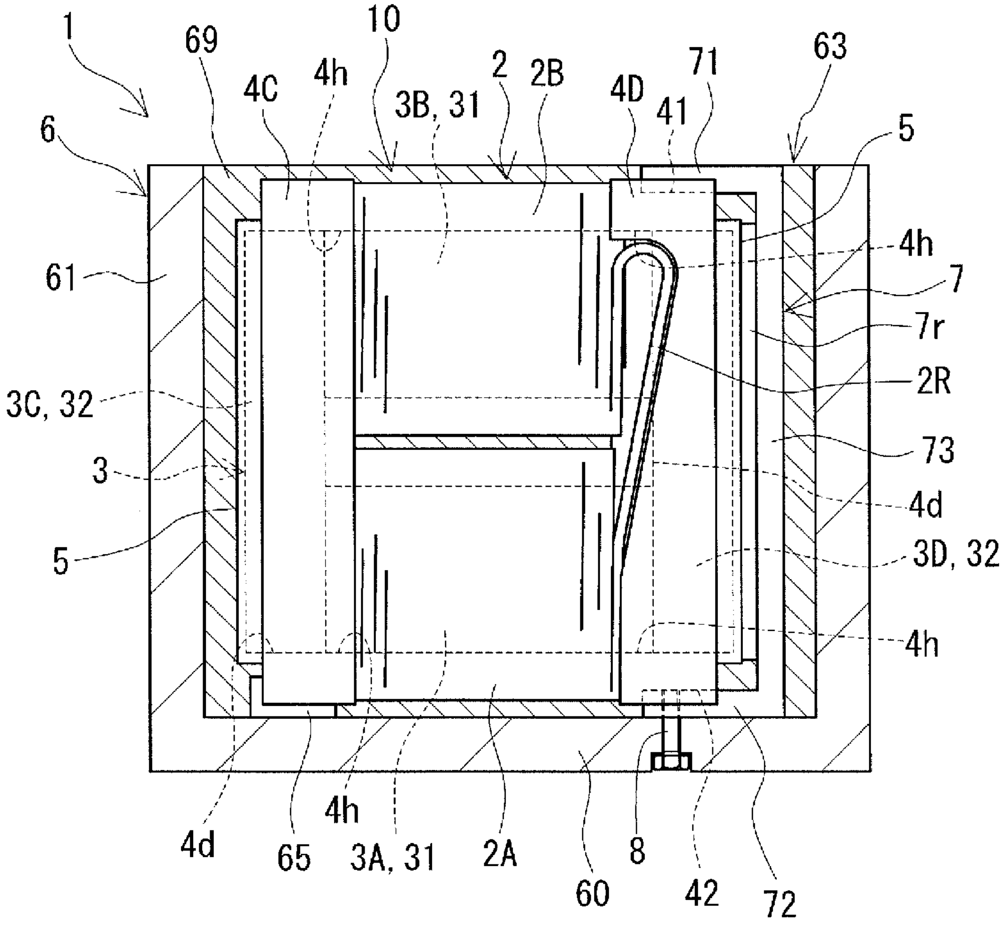
FIG. 1 is a partial longitudinal section of a reactor of a first embodiment with a case of the reactor shown in section.

In recent years, a reactor tends to be used with a high current of a high frequency with the spread of hybrid vehicles and electric vehicles. Thus, an assembly of the reactor violently vibrates when the reactor is used. Due to a relationship with an installation space of the reactor, the reactor may be so installed that an opening of a case faces sideways or downward. In that case, if the assembly violently vibrates, the assembly may be detached from the case. In the configuration of Patent Document 1, a stay for pressing the upper surface of the assembly is screwed to pedestal portions provided on four corners in the case. As a result, the assembly is firmly fixed to the case. However, in the configuration of Patent Document 1, there is a problem of enlarging the case by the pedestal portions provided on the four corners of the case.

The present disclosure was developed in view of the above situation and one object thereof is to provide a reactor enabling an assembly to be firmly fixed in a case without enlarging the reactor.

Effect of Present Disclosure

According to the above configuration, the assembly is firmly fixed in the case without enlarging the reactor.

Description of Embodiments of Present Disclosure

First, embodiments of the present disclosure are listed and described.

<1> A reactor according to an embodiment includes an assembly formed by assembling a coil and a magnetic core, the magnetic core including an inner core portion to be arranged inside the coil and an outer core portion to be arranged outside the coil, a case for accommodating the assembly inside, the case including a bottom plate portion, the assembly being placed on the bottom plate portion, a side wall portion for surrounding an outer periphery of the assembly and an opening, a grip member for sandwiching the assembly from the bottom plate portion side and the opening side inside the case, and a screw member for fixing the grip member to the bottom plate portion by penetrating into the case from outside of the bottom plate portion, the grip member including a first piece to be held in contact with a surface of the assembly on the opening side, a second piece to be held in contact with a surface of the assembly on the bottom plate portion side, and a third piece connecting the first piece and the second piece in a depth direction of the case.

According to the above configuration, the assembly is firmly fixed to the case via the grip member. Thus, even if the reactor vibrates, the detachment of the assembly from the case can be suppressed.

Further, the grip member is a member extending in the depth direction of the case, and the screw member for fixing the grip member to the case is arranged in the bottom plate portion. Thus, even if the grip member is provided, a planar area when the case is viewed from the opening side is not increased. By avoiding the enlargement of the case, the enlargement of the reactor is suppressed.

<2> As one aspect of the reactor of <1> above, the coil includes a first winding portion and a second winding portion having axes parallel to each other, and the first and second winding portions are vertically stacked in a direction orthogonal to the bottom plate portion and the axes of the first and second winding portions are both arranged to be parallel to the bottom plate portion.

According to the above configuration, the planar area when the case is viewed from the opening side is decreased. Thus, an installation area of the reactor is reduced. Here, “parallel” in this specification means “substantially parallel”. Specifically, parallel means not only geometrically parallel, but also substantially parallel with a deviation within ±5° from geometrically parallel.

<3> As one aspect of the reactor of <1> above, the coil includes a first winding portion and a second winding portion having axes parallel to each other, and the axes of the first and second winding portions are arranged to be orthogonal to the bottom plate portion.

According to the above configuration, the planar area when the case is viewed from the opening side is decreased. Thus, the installation area of the reactor is reduced. Here, “orthogonal” means “substantially orthogonal”. Specifically, orthogonal in this specification means not only geometrically orthogonal, but also substantially orthogonal with a deviation within ±5° from geometrically orthogonal.

<4> As one aspect of the reactor of <1> above, the coil includes a first winding portion and a second winding portion having axes parallel to each other, and the first and second winding portions are both arranged side by side on the bottom plate portion.

According to the above configuration, the case becomes shallower. Thus, even if the installation space of the reactor is small in a direction orthogonal to an installation place of the reactor, the reactor is easily installed.

<5> As one aspect of the reactor of <1> above, the coil includes a first winding portion, and an axis of the first winding portion is arranged to be parallel to the bottom plate portion.

According to the above configuration, the case becomes shallower. Thus, even if the installation space of the reactor is small in a direction orthogonal to an installation place of the reactor, the reactor is easily installed.

<6> As one aspect of the reactor of <1> above, the coil includes a first winding portion, and an axis of the first winding portion is arranged to be orthogonal to the bottom plate portion.

According to the above configuration, the planar area when the case is viewed from the opening side is decreased. Thus, the installation area of the reactor is reduced.

<7> As one aspect of the reactor of any one of <1> to <6> above, the assembly includes holding members for holding the coil and the outer core portion, one holding member being provided between one end surface of the coil and the outer core portion, the other holding member being provided between the other end surface of the coil and the outer core portion.

According to the holding members, insulation between the coil and the outer core portion is easily ensured. Further, according to the holding members, the coil and the magnetic core are easily positioned.

<8> As one aspect of the reactor of <7> above, the first and second pieces are in contact with the holding member.

The holding member is a member not involved in magnetic characteristics of the reactor. Accordingly, even if the grip member made of metal is used to ensure the strength of the grip member, the grip member is unlikely to affect the magnetic characteristics of the reactor. Further, even if the holding member is scratched by the grip member, the magnetic characteristics of the reactor are not deteriorated.

<9> As one aspect of the reactor of <8> above, the holding member includes a first groove portion and a second groove portion, the first piece being fit into the first groove portion, the second piece being fit into the second groove portion.

According to the above configuration, the assembly and the grip member are mechanically fit. Thus, a deviation of the grip member from the assembly due to vibration is suppressed.

<10> As one aspect of the reactor of any one of <1> to <9> above, the assembly includes a resin molded portion for at least partially covering the outer core portion.

The outer core portion is protected from an external environment by the resin molded portion. Here, in a configuration with the holding members, the resin molded portion has a role in firmly integrating the coil, the magnetic core and the holding members. Thus, the resin molded portion can effectively suppress the disassembling of the members constituting the assembly when the assembly vibrates.

<11> As one aspect of the reactor of <7> above, the assembly includes a resin molded portion for at least partially covering the outer core portion, and the first and second pieces are in contact with the resin molded portion.

The resin molded portion is a member not involved in the magnetic characteristics of the reactor. Accordingly, even if the grip member made of metal is used to ensure the strength of the grip member, the grip member is unlikely to affect the magnetic characteristics of the reactor. Further, even if the resin molded portion is scratched by the grip member, the magnetic characteristics of the reactor are not deteriorated.

<12> As one aspect of the reactor of <11> above, the resin molded portion includes a first groove portion and a second groove portion, the first piece being fit into the first groove portion, the second piece being fit into the second groove portion.

According to the above configuration, the assembly and the grip member are mechanically fit. Thus, a deviation of the grip member from the assembly due to vibration is suppressed.

<13> As one aspect of the reactor of any one of <1> to <12> above, the screw member includes a shaft portion and a head portion, and a head accommodating portion for accommodating the entire head portion is provided in a surface of the bottom plate portion outward of the case.

According to the above configuration, the screw member does not project from the outer surface of the bottom plate portion. Thus, the case is easily held in close contact with a flat installation object and heat dissipation to the installation object and the stability of the case with respect to the installation object are improved.

<14> As one aspect of the reactor of any one of <1> to <13> above, the case includes a facing surface on an inner peripheral surface of the case, the facing surface being on a side opposite to a side where the grip member is arranged, and a pressing portion projecting inwardly of the case from a position of the facing surface on the opening side, and the pressing portion is facing a surface of the assembly on the opening side.

According to the above configuration, the detachment of the assembly from the case is prevented on a side opposite to the grip member. In this configuration, one grip member is sufficient, wherefore the reactor can be easily manufactured.

<15> As one aspect of the reactor of any one of <1> to <14> above, the second piece includes a screw hole, the screw member being screwed into the screw hole.

According to the above configuration, the grip member is firmly fixed to the case by the screw member. As a result, the assembly is firmly fixed to the case.

<16> As one aspect of the reactor of <15> above, the second piece includes a reinforcing portion for making a part near the screw hole thicker than other parts.

The vicinity of the screw hole into which the screw member is screwed is a part where a stress easily acts when the assembly vibrates. By making this part locally thick, the damage of the grip member can be suppressed.

<17> As one aspect of the reactor of <16> above, the reinforcing portion is formed by a nut welded to the second piece.

In this configuration, a hole of the nut constitutes a part of the screw hole. By mounting the nut on the second piece later, the locally thickened reinforcing portion is easily formed. Further, since the screw member is screwed into the nut, the grip member is more firmly fixed by the screw member.

<18> As one aspect of the reactor of <16> or <17> above, the bottom plate portion includes a slide recess for accommodating the reinforcing portion slidably toward the side opposite to the side where the grip member is arranged, and the reinforcing portion is fixed by the screw member at a position in an end part of the slide recess.

According to the above configuration, the slide recess serves as a guide and the assembly is easily arranged at a predetermined position in the case. Particularly, the above configuration makes the reactor easily assembled while obtaining effects by the pressing portion if being combined with a configuration in which the case includes the pressing portion. This point is described in detail in a fourth embodiment to be described later.

<19> As one aspect of the reactor according to an embodiment, a sealing resin to be filled into the case is provided.

The assembly is more firmly fixed to the case by the sealing resin. Further, since a heat transfer path from the assembly to the case is secured by the sealing resin, the heat dissipation of the reactor is enhanced.

DETAILS OF EMBODIMENTS OF PRESENT DISCLOSURE

Embodiments of a reactor of the present disclosure are described on the basis of the drawings below. The same components are denoted by the same reference signs in the drawings. Note that the present invention is not limited to configurations shown in the embodiments and is intended to be represented by claims and include all changes in the scope of claims and in the meaning and scope of equivalents.

First Embodiment

Figure 2:
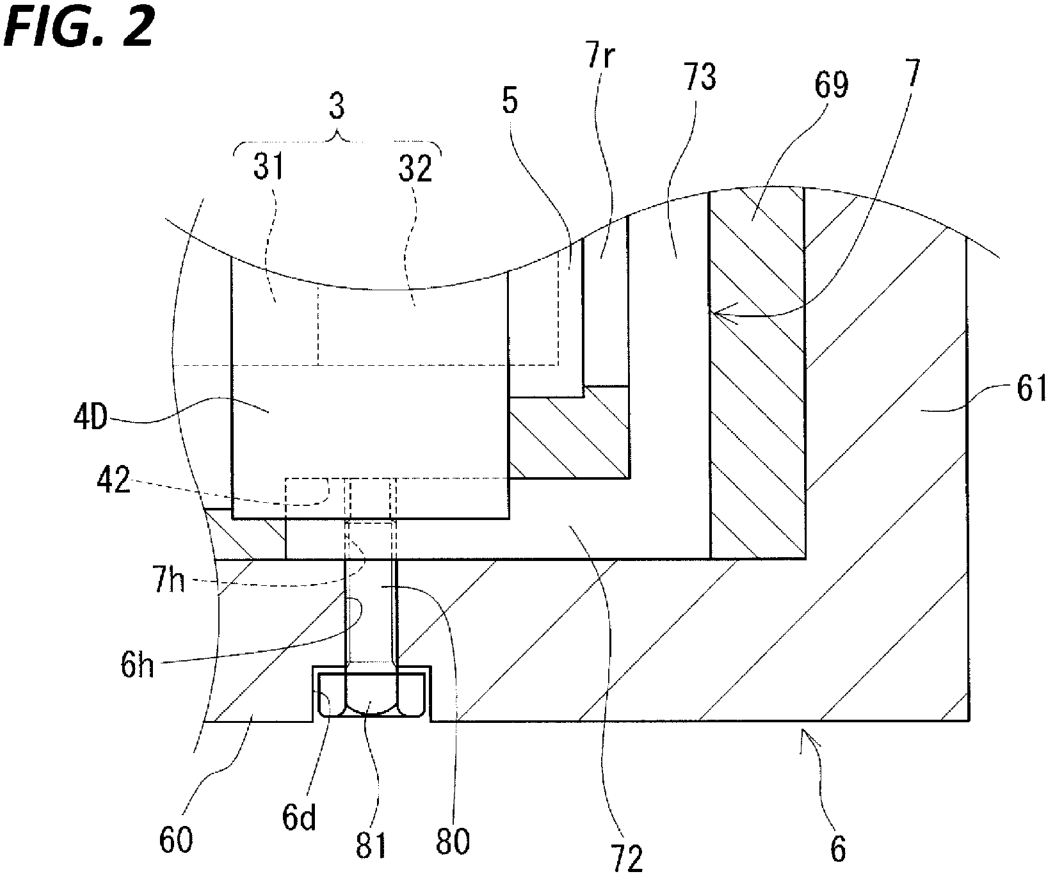
FIG. 2 is a partial enlarged view near a screw member of FIG. 1.
Figure 3:
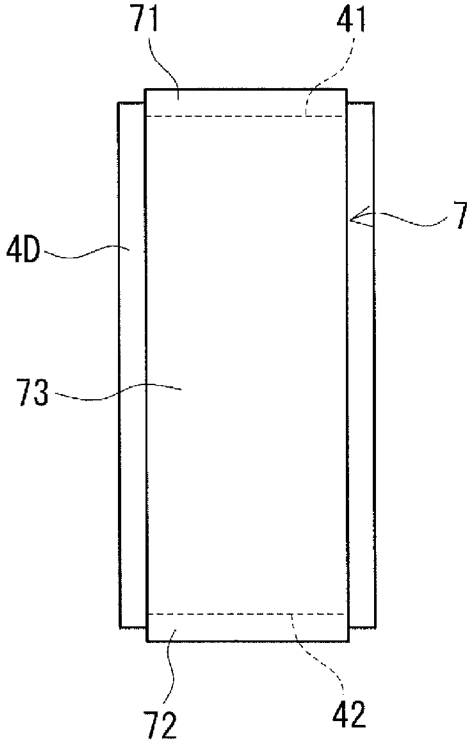
FIG. 3 is a schematic diagram showing a mounted state of a grip member on a holding member of FIG. 1.

In a first embodiment, the configuration of a reactor 1 is described on the basis of FIGS. 1 to 3. The reactor 1 shown in FIG. 1 is provided with an assembly 10 including a coil 2 and a magnetic core 3, and a case 6 for accommodating the assembly 10. One of features of this reactor 1 is to include a detachment preventing mechanism for preventing the detachment of the assembly 10 from the case 6. Each component of the reactor 1 is described in detail below.

<<Assembly>>

As shown in FIG. 1, the assembly 10 includes the coil 2, the magnetic core 3, a first holding member 4C and a second holding member 4D. In this example, the assembly 10 further includes resin molded portions 5 for integrating these members 2, 3, 4C and 4D.

[Coil]

The coil 2 of this embodiment includes a first winding portion 2A, a second winding portion 2B and a coupling portion 2R. The first and second winding portions 2A, 2B are so vertically stacked in the case 6 that the axes thereof are parallel. The coupling portion 2R couples the first and second winding portions 2A, 2B. In this example, the both winding portions 2A, 2B and the coupling portion 2R are formed by one winding wire. The respective winding portions 2A, 2B are so formed into a hollow tubular shape as to have the same number of turns and the same winding direction, and so arranged in parallel that axial directions are parallel. Unlike this example, the first and second winding portions 2A, 2B may have different numbers of turns or may have different sizes.

Each winding portion 2A, 2B of this embodiment is formed into a rectangular tube shape. The rectangular tubular winding portion 2A, 2B is a winding portion having a rectangular (including square) end surface shape with rounded corners. Of course, the winding portion 2A, 2B may be formed into a hollow cylindrical shape. The hollow cylindrical winding portion is a winding portion having a closed curved end surface shape (such as an elliptical shape, a true circular shape or a race track shape).

The coil 2 including the winding portions 2A, 2B can be formed by such a coated wire that an insulation coating made of an insulating material is provided on the outer periphery of a conductor, which is a flat rectangular wire or round wire made of a conductive material such as copper, aluminum, magnesium or an alloy of one of these. In this embodiment, each winding portion 2A, 2B is formed by winding a coated flat rectangular wire composed of a conductor formed by a flat rectangular wire made of copper and an insulation coating made of enamel (typically, polyamide-imide) in an edge-wise manner.

The coil 2 includes a first winding wire end part and a second winding wire end part to be connected to terminal members of an external device. In this example, the both winding wire end parts are not shown. The first winding wire end part is pulled out from the first winding portion 2A on one axial end side (side opposite to the coupling portion 2R) of the first winding portion 2A. The second winding wire end part is pulled out from the second winding portion 2B on one axial end side of the second winding portion 2B. The insulation coating such as enamel is striped on the winding wire end parts. The external device such as a power supply for supplying power to the coil 2 is connected via the terminal members connected to the winding wire end parts.

[Magnetic Core]

The magnetic core 3 of this example includes a first core piece 3A, a second core piece 3B, a third core piece 3C and a fourth core piece 3D. The first core piece 3A is an inner core portion 31 to be arranged inside the first winding portion 2A. The second core piece 3B is an inner core portion 31 to be arranged inside the second winding portion 2B. The third core piece 3C is an outer core portion 32 connecting one end (winding wire end part side: left side on the plane of FIG. 1) of the first core piece 3A and one end of the second core piece 3B. The fourth core piece 3D is an outer core portion 32 connecting the other end (side of the coupling portion 2R: right side on the plane of FIG. 1) of the first core piece 3A and the other end of the second core piece 3B. These core pieces 3A, 3B, 3C and 3D are connected in an annular manner to form a closed magnetic path. Unlike this example, the magnetic core 3 may be formed by connecting two U-shaped core pieces in an annular manner.

[[Inner Core Portions]]

The inner core portions 31, 31 are parts along the axial directions of the winding portions 2A, 2B of the coil 2. In this example, both end parts of parts of the inner core portions 31, 31 along the axial directions of the winding portions 2A, 2B project from the end surfaces of the winding portions 2A, 2B. Those projecting parts are also parts of the inner core portions 31, 31.

The shapes of the inner core portions 31, 31 are not particularly limited as long as the inner core portions 31, 31 are shaped in conformity with the inner shapes of the winding portions 2A, 2B. The inner core portion 31 of this example is substantially in the form of a rectangular parallelepiped. The inner core portion 31 may be configured by coupling a plurality of divided cores and gap plates. However, if the inner core portion 31 is one unitary member as in this example, it is preferable since the assembling of the reactor 1 is easy.

[[Outer Core Portions]]

The outer core portions 32, 32 are parts of the magnetic core 3 to be arranged outside the winding portions 2A, 2B. The shapes of the outer core portions 32, 32 are not particularly limited as long as the outer core portions 32, 32 are shaped to connect the end parts of the pair of inner core portions 31, 31. The outer core portion 32 of this example is substantially in the form of a rectangular parallelepiped. In this example, the outer core portion 32 is in contact with axial end surfaces of the inner core portions 31, 31 or substantially in contact therewith via an adhesive.

[[Materials, Etc.]]

The inner core portions 31 and the outer core portions 32 can be constituted by powder compacts formed by pressure-molding a raw material powder containing a soft magnetic powder or compacts of a composite material of a soft magnetic powder and a resin. For example, the inner core portions 31 may be compacts of a composite material and the outer core portions 32 may be powder compacts.

A compact of a composite material can be manufactured by filling a mixture of a soft magnetic powder and an uncured resin into a mold and curing the resin. The soft magnetic material is an aggregate of soft magnetic particles made of iron group metal such as iron or an alloy thereof (Fe—Si alloy, Fe—Ni alloy or the like). Insulation coatings made of phosphate or the like may be formed on the surfaces of the soft magnetic particles. A lubricant and the like may be contained in the raw material powder. On the other hand, examples of the resin contained in the composite material include thermosetting resins and thermoplastic resins. The thermosetting resins are, for example, an epoxy resin, a silicone resin, a urethane resin, a silicone resin and the like. The thermoplastic resins are, for example, a polyphenylene sulfide (PPS) resin, a polyamide (PA) resin and the like.

The content of the soft magnetic powder in the composite material may be 30% by volume or more and 80% by volume or less. In terms of improving a saturated magnetic flux density and heat dissipation, the content of the soft magnetic powder can be further 50% by volume or more, 60% by volume or more, or 70% by volume or more. In terms of improving fluidity in a manufacturing process, the content of the soft magnetic powder is preferably 75% by volume or less. In the compact of the composite material, as a filling rate of the soft magnetic powder decreases, the relative magnetic permeability thereof tends to decrease. For example, the relative magnetic permeability of the compact of the composite material may be 5 or more and 50 or less.

The powder compact easily enhances the content of the soft magnetic powder (e.g. more than 80% by volume and further 85% by volume or more) than the compact of the composite material and easily provides core pieces having higher saturated magnetic flux density and relative magnetic permeability. For example, the relative magnetic permeability of the powder compact may be 50 or more and 500 or less.

[Holding Members]

The reactor 1 of this example shown in FIG. 1 further includes the first and second holding members 4C, 4D for holding the coil 2 and the outer core portions 32. The first holding member 4C is interposed between the end surfaces of the winding portions 2A, 2B of the coil 2 and the third core piece 3C constituting the outer core portion 32 of the magnetic core 3 on the side of the unillustrated winding wire end parts of the coil 2 (left side on the plane of FIG. 1). On the other hand, the second holding member 4D is interposed between the end surfaces of the winding portions 2A, 2B of the coil 2 and the third core piece 3D constituting the outer core portion 32 of the magnetic core 3 on the side of the coupling portion 2R of the coil 2. The holding members 4C, 4D are typically made of an insulating material such as a PPS resin. The holding members 4C, 4D function as insulating members between the coil 2 and the magnetic core 3 and positioning members for the inner core portions 31, 31 and the outer core portions 32, 32 with respect to the winding portions 2A, 2B.

The holding member 4C, 4D is formed into a frame shape and includes a pair of through holes **4*h* and a core accommodating portion 4*d*. The through holes 4*h* are holes into which the end parts of the inner core portions 31, 31 are inserted. The core accommodating portion 4*d* is a recess into which the outer core portion 32 is fit. The through holes 4*h* communicate with a bottom part of the core accommodating portion 4*d*. Thus, the inner core portions 31, 31 and the outer core portions 32, 32 are coupled inside the holding members 4C, 4**D.

In this example, the second holding member 4D on the side of the coupling portion 2R includes a first groove portion 41 and a second groove portion 42. These groove portions 41, 42 constitute a part of the detachment preventing mechanism to be described later. The positions and roles of the groove portions 41, 42 are described when the detachment preventing mechanism is described.

[Resin Molded Portions]

The resin molded portions 5 are arranged to cover parts of the outer core portions 32, 32 exposed from the holding members 4C, 4D. The outer core portions 32, 32 are fixed to the holding members 4C, 4D and the outer core portions 32, 32 are protected from an external environment by the resin molded portions 5. The resin molded portions 5 of this example enter the insides of the holding members 4C, 4D and extend up to the vicinities of the end surfaces of the inner core portions 31, 31. Thus, the coil 2, the magnetic core 3 and the holding members 4C, 4D are integrated by the resin molded portions 5. The resin molded portions 5 may extend up to the insides of the winding portions 2A, 2B. In that case, the assembly 10 is more firmly bonded. Further, the resin molded portion 5 on the side of the first holding member 4C and the resin molded portion 5 on the side of the second holding member 4D may be connected inside the winding portions 2A, 2B.

For example, thermosetting resins, thermoplastic resins or the like can be utilized for the resin molded portions 5. If a ceramic filler such as alumina or silica is contained in these resins, the heat dissipation of the resin molded portions 5 is easily improved.

Here, the resin molded portions 5 of this example are provided only on sides of the holding members 4C, 4D where the outer core portions 32, 32 are arranged, and do not extend up to the outer peripheral surfaces of the winding portions 2A, 2B. In view of the functions of the resin molded portions 5, illustrated formation ranges of the resin molded portions 5 are sufficient. By limiting the formation ranges of the resin molded portions 5, there are an advantage of being able to reduce the amount of the resin used and an advantage of being able to suppress unnecessary enlargement of the reactor 1 by the resin molded portions 5. Further, since the outer peripheral surfaces of the winding portions 2A, 2B are exposed without being covered by the resin molded portions 5, the heat dissipation of the assembly 10 is enhanced.

[Case]

The case 6 includes a bottom plate portion 61 on which the assembly 10 is placed, a side wall portion 62 for surrounding the outer periphery of the assembly 10, and an opening 63 formed in an end part of the side wall portion 61. The bottom plate portion 60 and the side wall portion 61 may be integrally formed or the bottom plate portion 60 and the side wall portion 61 separately prepared may be coupled. A non-magnetic metal such as aluminum, aluminum alloy, magnesium, or magnesium alloy, a resin or the like can be, for example, utilized as a material of the case 6. If the bottom plate portion 60 and the side wall portion 61 are separate bodies, the bottom plate portion 60 and the side wall portion 61 can be made of different materials. For example, the bottom plate portion 60 may be made of non-magnetic metal and the side wall portion may be made of resin or vice versa.

In this example, the winding portions 2A, 2B of the assembly 10 are vertically stacked in the case 6. That is, the winding portions 2A, 2B are stacked in a direction orthogonal to the bottom plate portion 60 and the axes of the winding portions 2A, 2B are both parallel to the bottom plate portion 60.

The opening 63 of the case 6 of this example has a rectangular shape. Preferably, a length of the opening 63 along the axial directions of the winding portions 2A, 2B (length in a lateral direction on the plane of FIG. 1) is 80 mm or more and 120 mm or less, and a length of the opening 63 orthogonal to the axial directions of the winding portions 2A, 2B (length in a depth direction on the plane of FIG. 1) is 40 mm or more and 80 mm or less. On the other hand, a depth of the case 6 is preferably 80 mm or more and 150 mm or less. From these dimensions, an internal volume of the case 6 is 250 $cm^3$ or more and 1450 $cm^3$ or less.

The case 6 is formed with a through hole 6*h* (FIG. 2) constituting the detachment preventing mechanism to be described later. The position and function of the through hole 6*h* are described when the detachment preventing mechanism is described.

<<Sealing Resin>>>

In this example, a sealing resin 69 is filled into the case 6. The sealing resin 69 at least partially covers the assembly 10. The sealing resin 69 has various functions shown in (a) to (d) below. (a) A function of transferring the heat of the assembly 10 to the case 6. (b) A function of mechanically protecting the assembly 10 and protecting the assembly 10 from an external environment (improving corrosion resistance). (c) A function of improving electrical insulation between the assembly 10 and the case 6. (d) A function of improving the strength and rigidity of the reactor 1 by the integration of the assembly 10 and the case 6.

The sealing resin 69 of this example is substantially filled up to an opening end of the case 6 and embeds the entire assembly 10. That is, the upper surface of the sealing resin 69 is substantially flush with an end surface of the side wall portion 61 of the case 6. Thermosetting resins, thermoplastic resins and the like are used as a material of the sealing resin 69. The aforementioned ceramic filler may be contained in these resins.

<<Detachment Preventing Mechanism>>>

The reactor 1 of this embodiment has the detachment preventing mechanism for preventing the detachment of the assembly 10 from the case 6. The detachment preventing mechanism is mainly constituted by a grip member 7 for gripping the assembly 10 and a screw member 8 for screwing the grip member 7 to the case 6.

[Grip Member]

The grip member 7 is a substantially C-shaped member including a first piece 71, a second piece 72 and a third piece 73. The grip member 7 sandwiches the assembly 10 from the side of the bottom plate portion 60 and the side of the opening 63 inside the case 6 and grips the assembly 10. The first piece 71 is a part to be held in contact with a surface of the assembly 10 on the side of the opening 63 of the case 6. The second piece 72 is a part to be held in contact with a surface of the assembly 10 on the side of the bottom plate portion 60 of the case 6. The third piece 73 is a part connecting the first and second pieces 71, 72 in the depth direction of the case 6.

In this example, the first piece 71 is fit into the first groove portion 41 of the second holding member 4D. The first groove portion 41 is formed in a surface of the second holding member 4D on the side of the opening 63. More specifically, the first groove portion 41 extends from an outer end surface (end surface opposite to the coil 2) of the second holding member 4D toward the coil 2. The first groove portion 41 does not reach an inner end surface (end surface on the side of the coil 2) of the second holding member 4D. Thus, the tip of the first piece 71 fit into the first groove portion 41 is stopped in contact with an end surface in an extending direction of the first groove portion 41. Further, as shown in FIG. 3, the first groove portion 41 is narrower than a width of the second holding member 4D. Thus, a side end of the first piece 71 fit into the first groove portion 41 is stopped in contact with a side wall surface in a width direction of the first groove portion 41. Therefore, the first piece 71 is fit into the first groove portion 41 to be positioned with respect to the assembly 10.

The second piece 72 of this example is fit into the second groove portion 42 of the second holding member 4D. The second groove portion 42 is formed in a surface of the second holding member 4D on the side of the bottom plate portion 60. The second groove portion 42 is formed in the same manner as the first groove portion 41 (see also FIG. 3). Therefore, the second piece 72 is fit into the second groove portion 42 to be positioned with respect to the assembly 10.

The first piece 71 (second piece 72) and the first groove portion 41 (second groove portion 42) may be joined by the fitting of a projection and a recess. For example, a claw-like projection may be formed on the tip side of the first piece 71 (second piece 72) and a recess may be formed in the bottom surface of the first groove portion 41 (second groove portion 42). Of course, a recess may be formed on the first piece 71 (second piece 72) and a projection may be provided in the first groove portion 41 (second groove portion 42). According to this configuration, the separation of the assembly 10 from the grip member 7 can be effectively suppressed.

The third piece 73 of this example is a rectangular plate extending straight. Unlike this example, at least a part of the third piece 73 may be curved in a direction away from the fourth core piece 3D.

The grip member 7 is preferably made of metal in terms of enhancing the mechanical strength thereof. For example, the grip member 7 may be made of non-magnetic metal such as aluminum alloy or magnesium alloy. Since the grip member 7 of this example is engaged with the second holding member 4D made of resin, even if the grip member 7 is made of metal, it is unlikely to affect magnetic characteristics of the assembly 10 and insulation characteristics of the assembly 10 and the case 6. In this example, an insulating material 7*r* arranged between the resin molded portion 5 covering the fourth core piece 3D and the third piece 73 ensures insulation between the second holding member 4D and the grip member 7. If insulation by the resin molded portion 5 is sufficient, the insulating material 7*r* may be omitted and the third piece 73 may be held in contact with the resin molded portion 5. Also if the third piece 73 is curved outward and reliably separated from the resin molded portion 5, the insulating material 7*r* can be omitted. Besides, insulation between the second holding member 4D and the grip member 7 may be ensured by a resin covering the outer periphery of the grip member 7. In this case, the fourth core piece 3D can be gripped by the grip member 7.

Here, if the mechanical strength of the grip member 7 can be ensured, the grip member 7 may be made of resin. For example, the grip member 7 can be made of fiber reinforced plastic or the like. If the grip member 7 is made of resin, the fourth core piece 3D can be gripped by the grip member 7.

[Screw Member and Arranged State Thereof]

The screw member 8 is a member for fixing the grip member 7 to the bottom plate portion 60 by penetrating into the case 6 from the outside of the bottom plate portion 60. As shown in FIG. 2, the screw member 8 includes a shaft portion 80 formed with an external thread and a head portion 81 formed on one end of the shaft portion 80. In this example, to fix the grip member 7 to the bottom plate portion 60 by the screw member 8, the bottom plate portion 60 is provided with the through hole 6*h* and a head accommodating portion 6*d* and the second piece 72 is provided with a screw hole 7*h*.

The through hole 6*h* provided in the bottom plate portion 60 of the case 6 is a clearance hole through which the shaft portion 80 is inserted. Unlike this example, an internal thread corresponding to the shaft portion 80 may be formed in the inner peripheral surface of the through hole 6*h*. On the other hand, the head accommodating portion 6*d* provided in the bottom plate portion 60 is a recess for accommodating the entire head portion 81. A depth of the head accommodating portion 6*d* is equal to or more than a length of the head portion 81. Thus, the head portion 81 accommodated in the head accommodating portion 6*d* does not project from an outer surface of the bottom plate portion 60. The through hole 6*h* and the head accommodating portion 6*d* are coaxial, and an inner diameter of the head accommodating portion 6*d* is larger than that of the through hole 6*h*. A step formed between the through hole 6*h* and the head accommodating portion 6*d* serves as a seat surface for the screw member 8.

The shaft portion 80 of the screw member 8 is inserted into the screw hole 7*h* provided in the second piece 72. The screw hole 7*h* of this example penetrates through the second piece 72 in a thickness direction and an internal thread is formed in the inner peripheral surface thereof. That is, by screwing the screw member 8 into the screw hole 7*h*, the grip member 7 can be firmly fixed to the bottom plate portion 60 by the screw member 8. Unlike this example, the screw hole 7*h* may not penetrate through the second piece 72. Further, a part near the screw hole 7*h* may be thicker than other parts.

The tip of the shaft portion 80 of this example is in contact with the second holding member 4D. The tip of the shaft portion 80 presses the second holding member 4D, whereby the second holding member 4D is fixed to the bottom plate portion 60 by the screw member 8. As a result, the assembly 10 is more firmly fixed by the screw member 8. To more firmly fix by the screw member 8, a screw hole for receiving the tip of the shaft portion 80 may be provided in the surface of the second holding member 4D on the side of the bottom plate portion 60.

[Miscellaneous]

The reactor 1 of this example is configured such that one side of the assembly 10 is held by the grip member 7. To enhance the stability of the assembly 10 in the case 6, the bottom plate portion 60 of the case 6 is provided with an L-shaped pedestal portion 65 (FIG. 1) in this example. The pedestal portion 65 is a member for supporting the first holding member 4C from below and determining the position of the first holding member 4C in the case 6. A height of a part of the pedestal portion 65 parallel to the bottom plate portion 60 is set such that a height of the first holding member 4C from the bottom plate portion 60 and a height of the second holding member 4D from the bottom plate portion 60 are equal. A part of the pedestal portion 65 extending toward the opening 63 is facing an outer end surface of the first holding member 4C and suppresses a movement of the assembly 10 in a direction away from the grip member 7.

The pedestal portion 65 may be integrally formed to the bottom plate portion 60 or may be mounted on the bottom plate portion 60 later. In terms of ensuring mechanical strength, the pedestal portion 65 is preferably made of metal.

<<Use Mode>>>

The reactor 1 of this example can be utilized as a constituent component of a power converter such as a bidirectional DC-DC converter to be installed in an electrically driven vehicle such as a hybrid vehicle, an electric vehicle or a fuel cell vehicle.

<<Effects>>

According to the configuration of the reactor 1 of this example, the assembly 10 is firmly fixed to the case 6 via the grip member 7. Thus, even if the reactor 1 vibrates, the detachment of the assembly 10 from the case 6 can be suppressed.

In this example, the winding portions 2A, 2B are vertically stacked in the case 6. Thus, the reactor 1 of this example can reduce a planar area when viewed from the side of the opening 63 (i.e. installation area of the reactor 1) as compared to a reactor of a horizontally placed type in which winding portions 2A, 2B are arranged side by side on the bottom plate portion 60 of the case 6. Further, in this example, the grip member 7 is a member extending in the depth direction of the case 6, and the screw member 8 for fixing the grip member 7 to the case 6 is arranged on the bottom plate portion 60. Thus, even if the grip member 7 is provided, the planar area when the case 6 is viewed from the side of the opening 63 is not increased. By avoiding the enlargement of the case 6, the enlargement of the reactor 1 is suppressed.

Second Embodiment

Figure 4:
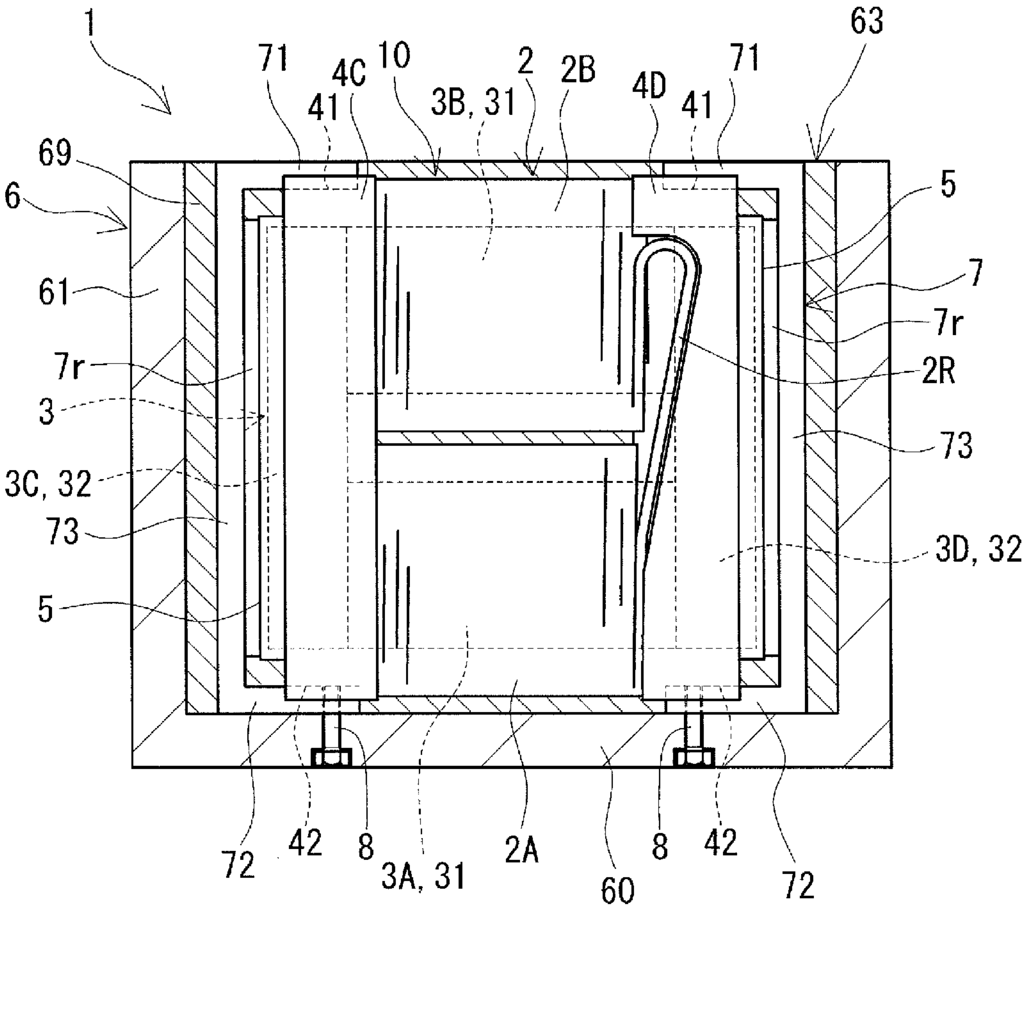
FIG. 4 is a partial longitudinal section of a reactor of a second embodiment.

In a second embodiment, a configuration for fixing an assembly 10 using two grip members 7 is described on the basis of FIG. 4. Some of reference signs not related to the description of the configuration are not shown in FIG. 4. This holds for FIGS. 5 to 9 to be described later.

In a reactor 1 of this example shown in FIG. 4, not only a second holding member 4D, but also a first holding member 4C are fixed to a bottom plate portion 60 by the grip members 7. According to the configuration of this example, the assembly 10 is more firmly fixed to a case 6 than in the configuration of the first embodiment.

Here, the first holding member 4C is on a side where winding wire end parts of an unillustrated coil 2 are pulled out. So as not to hinder the winding wire end parts, the grip member 7 for the first holding member 4C may have a smaller width (length in a depth direction on the plane of FIG. 4) than the grip member 7 for the second holding member 4D.

Third Embodiment

Figure 5:
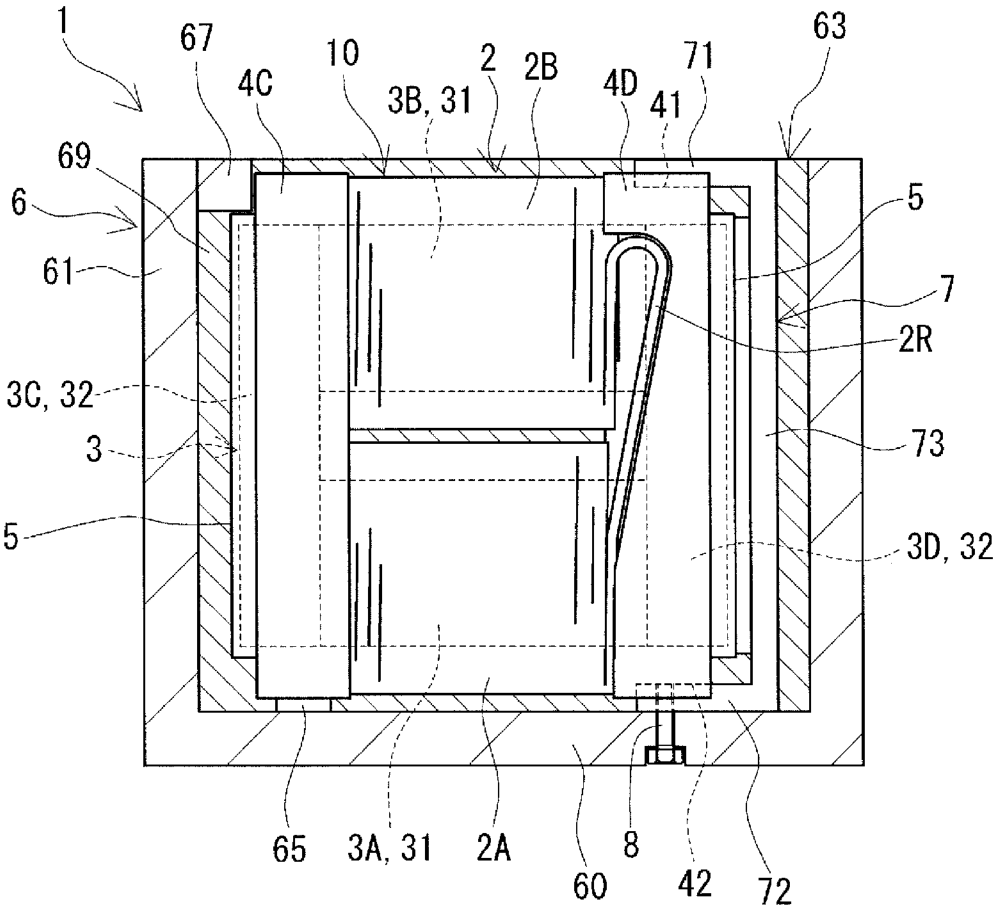
FIG. 5 is a partial longitudinal section of a reactor of a third embodiment.

A reactor 1 of a third embodiment is described on the basis of FIG. 5.

A case 6 of the reactor 1 of this example includes a pressing portion 67 on a facing surface on the inner peripheral surface of the case 6, the facing surface being on a side opposite to a side where a grip member 7 is arranged. That is, the pressing portion 67 is provided on a short side of an opening 63. This pressing portion 67 projects inwardly of the case 6 from a position of the inner peripheral surface of the case 6 on the side of the opening 63. This pressing portion 67 is in contact with a surface of a resin molded portion 5 on the side of the opening 63. Thus, a third core piece 3C of an assembly 10 is mechanically stopped so as not to protrude from the case 6. Thus, according to the configuration of this example, the assembly 10 is more firmly fixed to the case 6 than in the configuration of the first embodiment.

To manufacture the reactor 1 of this example, the grip member 7 may be mounted on the assembly 10 and the assembly 10 may be so accommodated into the case 6 as to avoid the pressing portion 67. Specifically, the assembly 10 is inserted at a rightward position of the case 6 of FIG. 5. Subsequently, the assembly 10 is slid toward the pressing portion 67 in the case 6 and a screw hole 7*h* (see FIG. 2) of the grip member 7 and a through hole 6*h* (see FIG. 2) of the case 6 are aligned. Then, the assembly 10 is screwed to the case 6 by a screw member 8.

Fourth Embodiment

Figure 6:
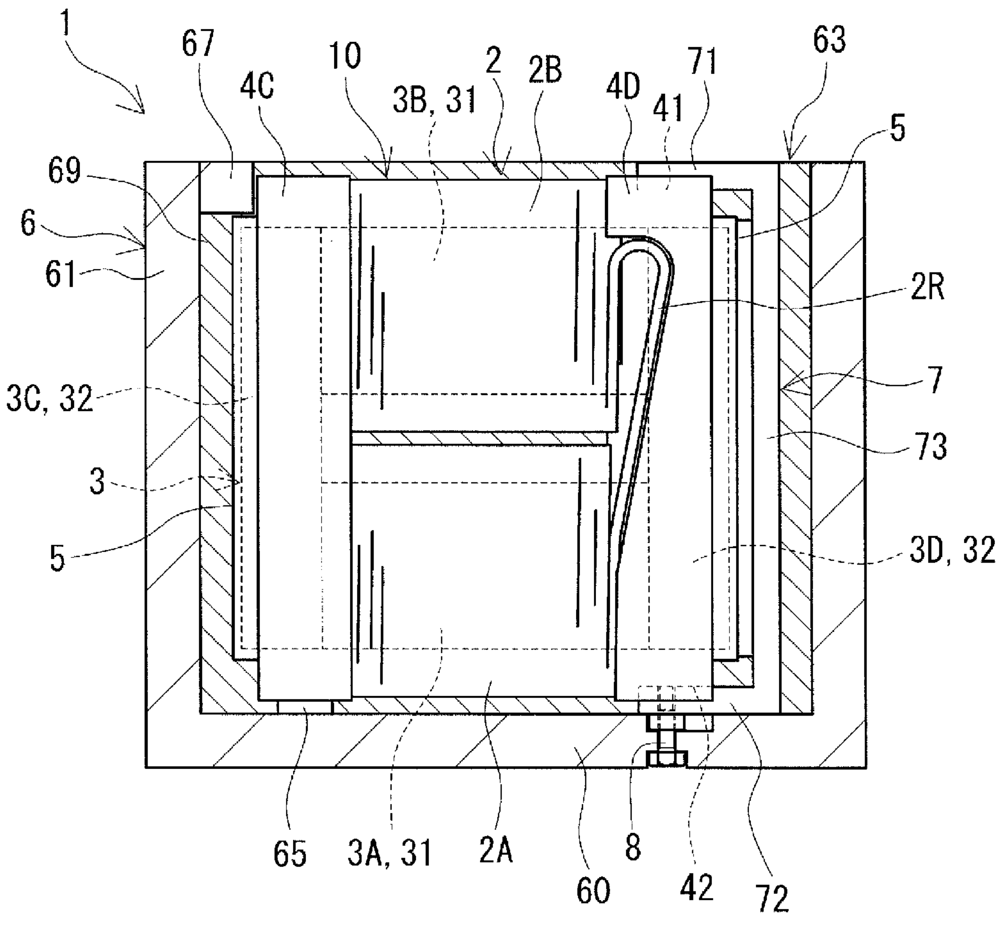
FIG. 6 is a partial longitudinal section of a reactor of a fourth embodiment.
Figure 7:
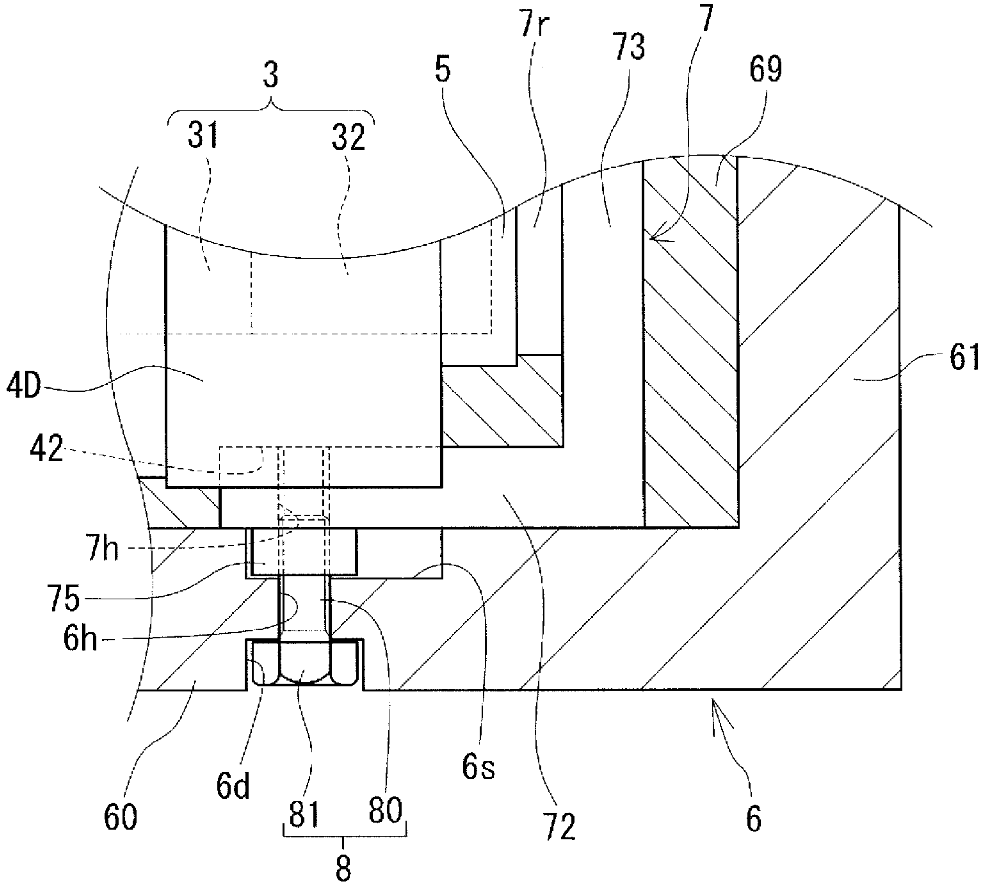
FIG. 7 is a partial enlarged view near a screw member of FIG. 6.

A reactor 1 of a fourth embodiment is described on the basis of FIGS. 6 and 7. The reactor 1 of this example is a modification of the third embodiment.

The reactor 1 of this example shown in FIG. 6 differs from the third embodiment in a configuration near a screw member 8. As shown in a partial enlarged view of FIG. 7, a second piece 72 of a grip member 7 of this example includes a reinforcing portion 75 for making a part near a screw hole 7*h* thicker than other parts. The reinforcing portion 75 of this example is formed by welding a nut to the second piece 72. By using the nut, the reinforcing portion 75 is easily formed on the grip member 7. For example, the grip member 7 with the reinforcing portion 75 is fabricated only by press-working a plate material to form the grip member 7 and welding the nut to the grip member 7. Further, since the nut is formed with an internal thread in the inner peripheral surface thereof, there is an advantage that threading needs not be performed to the screw hole 7*h* except a hole of the nut. Of course, the reinforcing portion 75 can be also integrally formed to the second piece 72 in fabricating the grip member 7.

A bottom plate portion 60 of the case 6 of this example includes a slide recess 6*s*. The slide recess 6*s* is provided at a position corresponding to the through hole 6*h* in the inner surface of the bottom plate portion 60. The slide recess 6*s* is a groove in the form of a long hole extending toward a side where a pressing portion 67 (FIG. 6) is provided. An extending direction of the slide recess 6*s* of this example coincides with axial directions of winding portions 2A, 2B (FIG. 6).

A depth of the slide recess 6*s* is set such that the entire reinforcing portion 75 can be accommodated. Thus, if the reinforcing portion 75 is fit into the slide recess 6*s*, the second piece 72 comes into surface contact with the bottom plate portion 60. As a result, the stability of the assembly 10 in the case 6 is ensured. The reinforcing portion 75 fit into the slide recess 6*s* is fixed by the screw member 8 at a position in an end part of the slide recess 6*s* on the side of the pressing portion 67 (FIG. 6). When the reinforcing portion 75 is at the shown position, the pressing portion 67 of FIG. 6 presses a resin molded portion 5 for a third piece 3C from the side of the opening 63.

In the case of manufacturing this reactor 1, the assembly 10 having the grip member 7 mounted thereon is accommodated into the case 6. At that time, the reinforcing portion 75 of the grip member 7 is fit at a position of the slide recess 6*s* on the right side of plane of FIG. 6 (position on a side away from the pressing portion 67 of FIG. 6). Since the pressing portion 67 has such a length as not to interfere with the assembly 10, the pressing portion 67 does not hinder the accommodation of the assembly 10. Thereafter, the assembly 10 is slid toward the pressing portion 67 and, as shown in FIG. 7, the screw hole 7*h* of the grip member 7 and the through hole 6*h* of the case 6 are coaxially aligned and fastened by the screw member 8.

In the reactor 1 of this example, the assembly 10 is more easily arranged in the case 6 than in the configuration of the third embodiment. This is because the slide recess 6*s*, into which the reinforcing portion 75 is fit, serves as a guide and the screw hole 7*h* of the grip member 7 and the through hole 6*h* of the case 6 are easily aligned.

Fifth Embodiment

Figure 8:
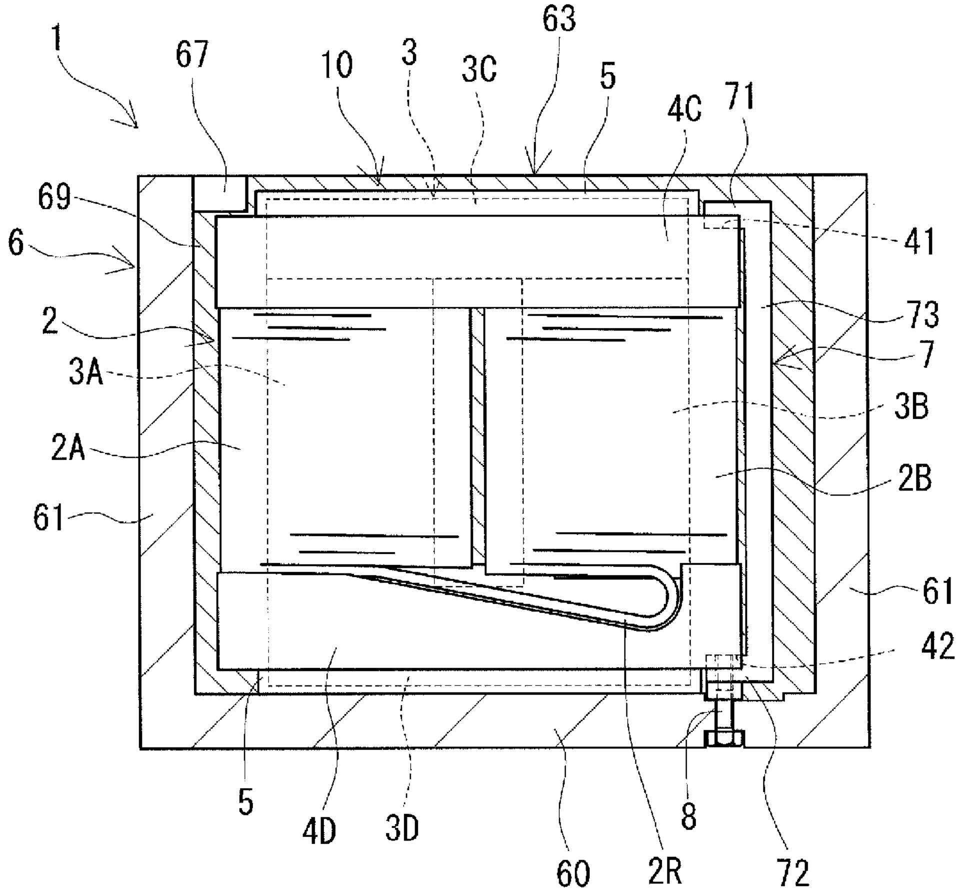
FIG. 8 is a partial longitudinal section of a reactor of a fifth embodiment.

A reactor 1 of a fifth embodiment is described on the basis of FIG. 8. Since a detachment preventing mechanism of this example is configured similarly to that of the fourth embodiment, the detachment preventing mechanism is not described in detail.

In the reactor 1 of this example, the axes of winding portions 2A, 2B are arranged to be orthogonal to a bottom plate portion 60. That is, the winding portions 2A, 2B are arranged in an upright state in a case 6. In this example, a first holding member 4C is arranged on the side of an opening 63 and a second holding member 4D is arranged on the side of the bottom plate portion 60. As a result, winding wire end parts of a coil 2 are arranged on the side of the opening 63, wherefore the winding wire end parts are easily pulled out to the outside of the case 6.

In the case of this example, a first piece 71 of a grip member 7 comes into contact with the first holding member 4C and a second piece 72 comes into contact with the second holding member 4D. That is, a first groove portion 41 is formed in the first holding member 4C and a second groove portion 42 is formed in the second holding member 4D.

In this example, the winding portions 2A, 2B are upright in the case 6. Thus, the reactor 1 of this example has a smaller installation area than a reactor of the horizontally placed type.

Sixth Embodiment

Figure 9:
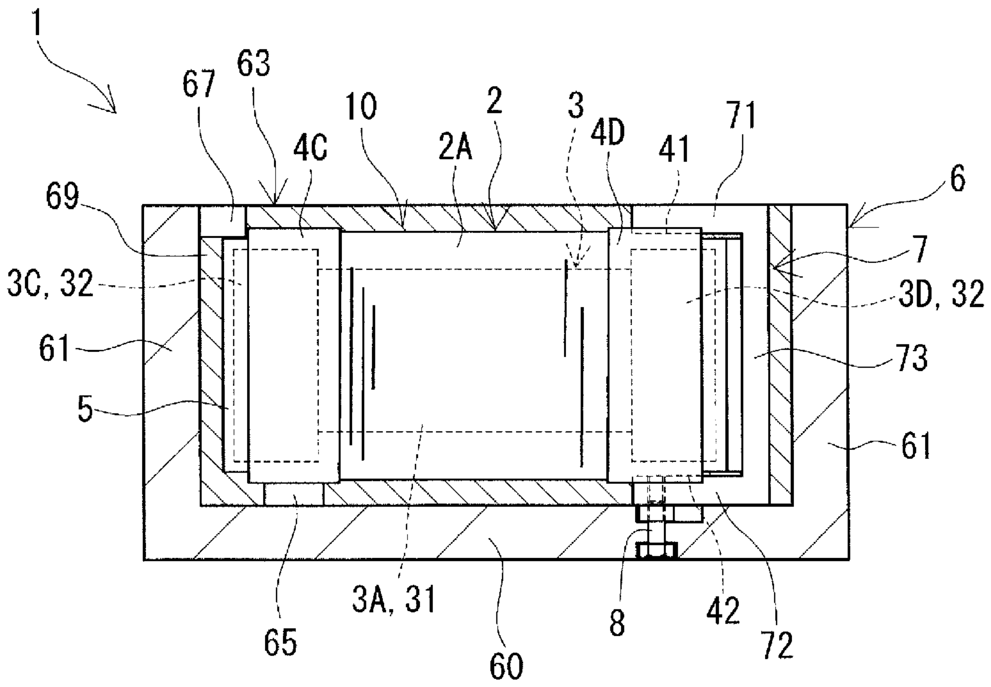
FIG. 9 is a partial longitudinal section of a reactor of a sixth embodiment.

A reactor 1 of a sixth embodiment is described on the basis of FIG. 9. Since a detachment preventing mechanism of this example is configured similarly to that of the fourth embodiment, the detachment preventing mechanism is not described in detail.

In the reactor 1 of this example, a first winding portion 2A and a second winding portion 2B (hidden on a back side on the plane of FIG. 9) are both arranged side by side on a bottom plate portion 60. According to the reactor 1 of this example, an assembly 10 is entirely accommodated in a case 6 even if the case 6 is shallow. Thus, the reactor 1 is easily installed even if an installation space of the reactor 1 is small in a direction orthogonal to an installation place of the reactor 1.

Seventh Embodiment

The configurations of the first to sixth embodiments can be combined as appropriate. For example, the detachment preventing mechanisms of the first to third embodiments may be employed as the detachment preventing mechanisms of the fifth and sixth embodiments.

Eighth Embodiment

Figure 10:
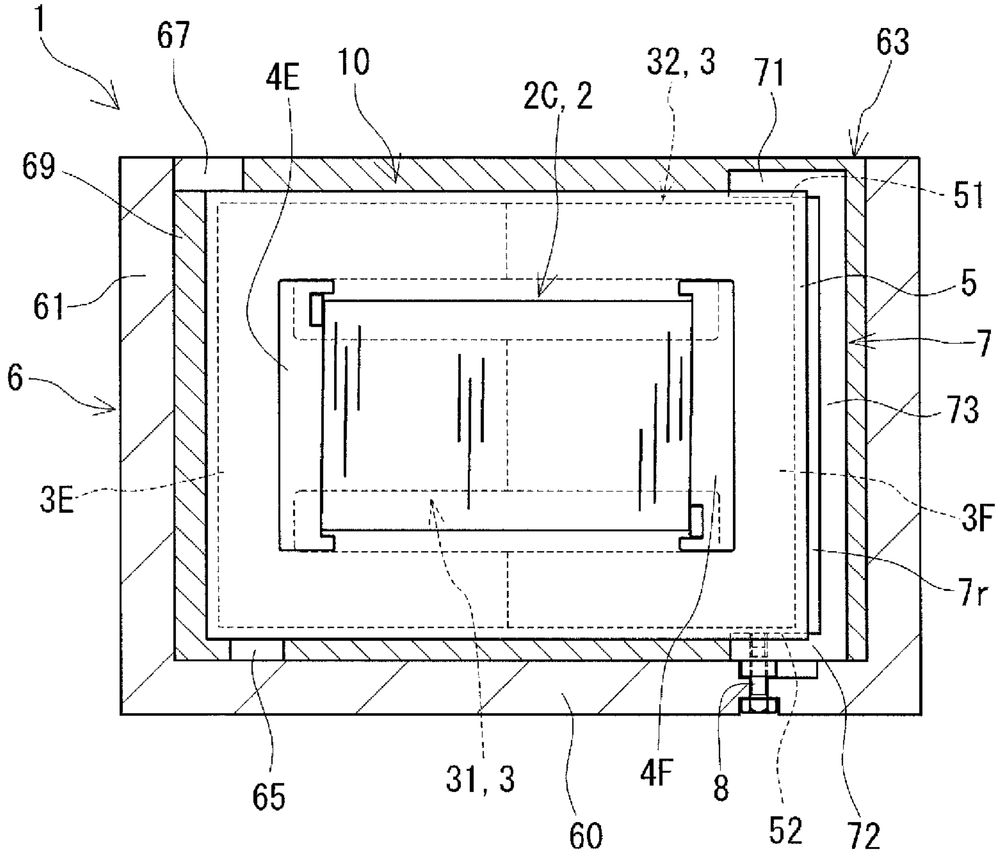
FIG. 10 is a partial longitudinal section of a reactor of an eighth embodiment.

In an eight embodiment, a reactor 1 in which a coil 2 includes one first winding portion 2C is described on the basis of FIG. 10. In this example, in conformity with the shape of the coil 2, the shape of a magnetic core 3, the shapes of holding members 4E, 4F and a formation range of a resin molded portion 5 are different from those of the first to sixth embodiments. In FIG. 10, components similar to those of the first to sixth embodiments are denoted by the same reference signs.

The first winding portion 2C of the coil 2 of this example is arranged in parallel to a bottom plate portion 60 of a case 6. Winding wire end parts are appropriately pulled toward an opening of the case 6.

A magnetic core 3 of this example includes a substantially E-shaped first core piece 3E and a substantially E-shaped second core piece 3F. Each of the first and second core pieces 3E, 3F includes a base portion and three leg portions. The leg portions are arranged on one end, the other end and a middle of the base portion. An extending direction of the leg portions are orthogonal to that of the base portion. Thus, each of the first and second core pieces 3E, 3F has a substantially E-shaped appearance. End surfaces of the respective leg portions of the first core piece 3F and those of the respective leg portions of the second core piece 3F are butted against each other. An inner core portion 31 is formed by the middle leg portion of the first core piece 3E and the middle leg portion of the second core piece 3F. On the other hand, an annular outer core portion 32 is formed by parts of the first core piece 3E except the middle leg portion and parts of the second core piece 3F except the middle leg portion. In this example, the outer core portion 32 is so arranged that a center axis of the annular shape of the outer core portion 32 is parallel to the bottom plate portion 60 and orthogonal to an axial direction of the first winding portion 2C. Unlike this example, the magnetic core 3 may include a substantially E-shaped core piece and a substantially I-shaped core piece.

The first holding member 4E is arranged on one end surface of the first winding portion 2C to ensure insulation between the one end surface of the first winding portion 2C and the first core piece 3E. The second holding member 4F is arranged on the other end surface of the second winding portion 2C to ensure insulation between the other end surface of the first winding portion 2C and the second core piece 3F. Either of the holding members 4E, 4F is a frame-like member including a through hole through which the middle leg portion of the core piece 3E, 3F is passed.

A resin molded portion 5 of this example entirely covers the annular outer core portion 32. The first winding portion 2C is exposed from the resin molded portion 5 without being covered by the resin molded portion 5. A first groove portion 51 is provided in the upper end surface of a part of the resin molded portion 5 arranged on the side of the opening 63 of the case 6. Further, a second groove portion 52 is provided in the lower end surface of a part of the resin molded portion 5 arranged on the side of the bottom plate portion 60 of the case 6.

A grip member 7 of this example sandwiches the upper and lower end surfaces of the resin molded portion 5 in an assembly 10 to fix the assembly 10 to the case 6. More specifically, each of first and second pieces 71, 72 provided in the grip member 7 are respectively fit into the first groove portion 51 and the second groove portion 52 provided in the resin molded portion 5. A structure for fixing the grip member 7 to the case 6 by a screw member 8, a structure for supporting the assembly 10 by a pedestal portion 65 and a structure for preventing the detachment of the assembly 10 by a pressing portion 67 are similar to the structures of the fourth embodiment shown in FIGS. 6 and 7.

According to the configuration of this example, a planar area when the case 6 is viewed from the side of the opening 63 is small Thus, the enlargement of the case 6 and that of the reactor 1 are suppressed.

Ninth Embodiment

Figure 11:
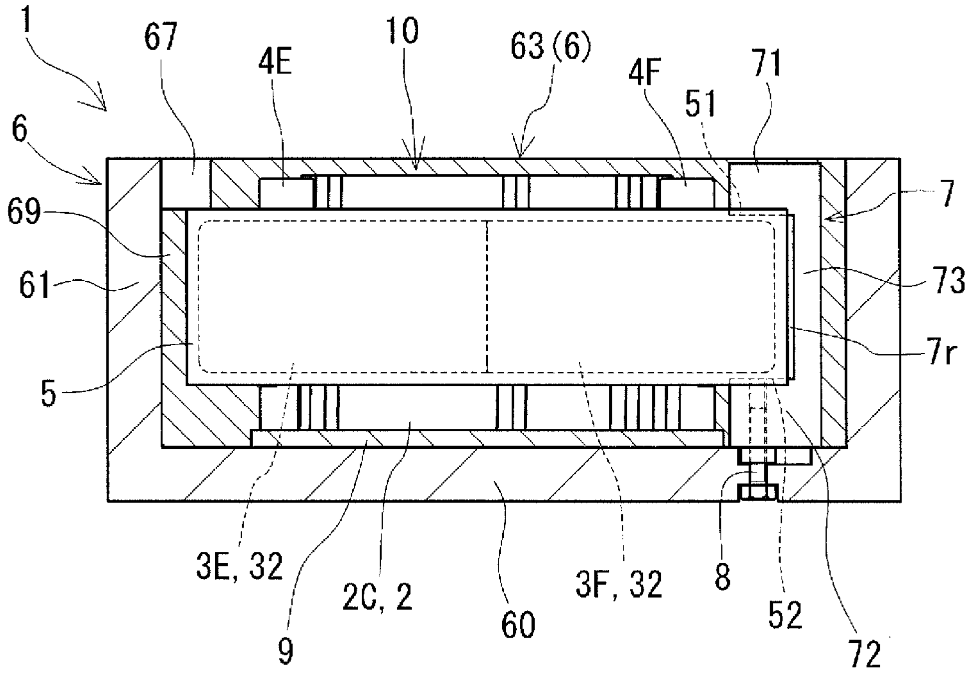
FIG. 11 is a partial longitudinal section of a reactor of a ninth embodiment.

In a ninth embodiment, a reactor 1 in which the assembly 10 shown in the eight embodiment is horizontally placed in a case 6 is described on the basis of FIG. 11. Components similar to those of the eighth embodiment are not described.

An axis of a first winding portion 2C of the ninth embodiment is arranged to be parallel to a bottom plate portion 60. On the other hand, a center axis of an annular shape of an outer core portion 32 of a magnetic core 3 is arranged along a depth direction of the case 6. That is, the center axis is orthogonal to the bottom plate portion 60.

In this example, a part of the outer peripheral surface of the first winding portion 2C exposed from a resin molded portion 5 is facing the bottom plate portion 60 of the case 6. Accordingly, in this example, an insulation layer 9 is arranged between the outer peripheral surface of the first winding portion 20 and the bottom plate portion 60. The insulation layer 9 is made of a material having a predetermined insulation property. If the insulation layer 9 is adhesive, the assembly 10 is more firmly fixed to the case 6.

According to the configuration of this example, even if the case 6 is shallow, the entire assembly 10 is accommodated in the case 6. Even if an installation space of the reactor 1 is small in a direction orthogonal to an installation place of the reactor 1, the reactor 1 is easily installed.

Tenth Embodiment

Figure 12:
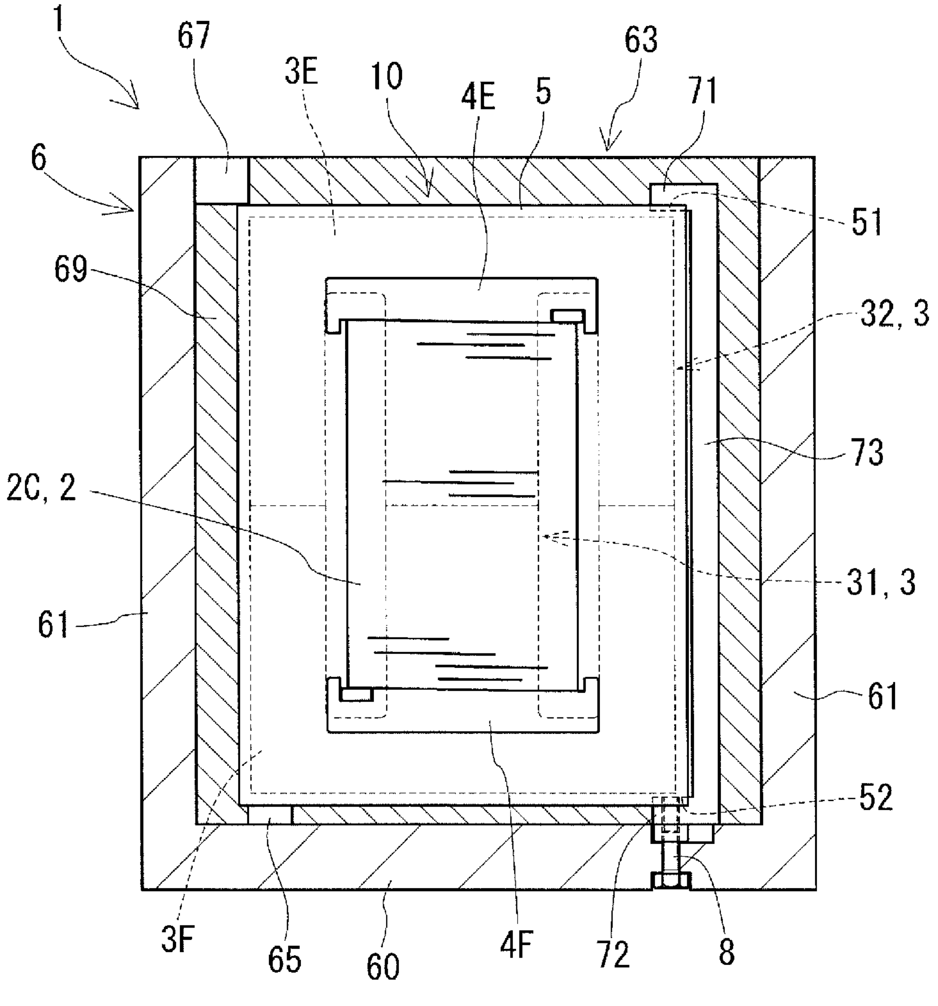
FIG. 12 is a partial longitudinal section of a reactor of a tenth embodiment.

In a tenth embodiment, a reactor 1 in which the assembly 10 shown in the eighth and ninth embodiments is arranged upright in a case 6 is described on the basis of FIG. 12. Components similar to those of the eighth embodiment are not described.

An axis of a first winding portion 2C of the tenth embodiment is arranged to be orthogonal to a bottom plate portion 60. On the other hand, a center axis of an annular shape of an outer core portion 32 of a magnetic core 3 is arranged in parallel to the bottom plate portion 60.

According to the configuration of this example, a planar area when the case 6 is viewed from the side of an opening 63 is small. Thus, the enlargement of the case 6 and that of the reactor 1 are suppressed.

LIST OF REFERENCE NUMERALS

- 1 reactor
- 10 assembly
- 2 coil
  - 2A, 2C first winding portion, 2B second winding portion, 2R coupling portion
- 3 magnetic core
  - 31 inner core portion, 32 outer core portion
  - 3A, 3E first core piece, 3B, 3F second core piece
  - 3C third core piece, 3D fourth core piece
- 4C, 4E first holding member, 4D, 4F second holding member
  - 4*d* core accommodating portion, 4*h* through hole
  - 41 first groove portion, 42 second groove portion
- 5 resin molded portion
  - 51 first groove portion, 52 second groove portion
- 6 case
  - 60 bottom plate portion, 61 side wall portion, 63 opening, 65 pedestal portion
  - 67 pressing portion, 69 sealing resin
  - 6*d* head accommodating portion, 6*h* through hole, 6*s* slide recess
- 7 grip member
  - 7*h* screw hole, 7*r* insulating material
  - 71 first piece, 72 second piece, 73 third piece, 75 reinforcing portion
- 8 screw member
  - 80 shaft portion, 81 head portion
- 9 insulation layer

What is claimed is:

1. A reactor, comprising:

an assembly formed by assembling a coil and a magnetic core, the magnetic core including an inner core portion to be arranged inside the coil and an outer core portion to be arranged outside the coil;

a case for accommodating the assembly inside, the case including a bottom plate portion, the assembly being placed on the bottom plate portion, a side wall portion for surrounding an outer periphery of the assembly, and an opening, a grip member for sandwiching the assembly from the bottom plate portion side and the opening side inside the case; and a screw member for fixing the grip member to the bottom plate portion by penetrating into the case from outside of the bottom plate portion, the grip member including:

a first piece to be held in contact with a surface of the assembly on the opening side;

a second piece to be held in contact with a surface of the assembly on the bottom plate portion side; and a third piece connecting the first piece and the second piece in a depth direction of the case.

2. The reactor of claim 1, wherein:

the coil includes a first winding portion and a second winding portion having axes parallel to each other, and the first and second winding portions are vertically stacked in a direction orthogonal to the bottom plate portion and the axes of the first and second winding portions are both arranged to be parallel to the bottom plate portion.

3. The reactor of claim 1, wherein:

the coil includes a first winding portion and a second winding portion having axes parallel to each other, and the axes of the first and second winding portions are arranged to be orthogonal to the bottom plate portion.

4. The reactor of claim 1, wherein:

the coil includes a first winding portion and a second winding portion having axes parallel to each other, and the first and second winding portions are both arranged side by side on the bottom plate portion.

5. The reactor of claim 1, wherein:

the coil includes a first winding portion, and an axis of the first winding portion is arranged to be parallel to the bottom plate portion.

6. The reactor of claim 1, wherein:

the coil includes a first winding portion, and an axis of the first winding portion is arranged to be orthogonal to the bottom plate portion.

7. The reactor of claim 1, wherein the assembly includes holding members for holding the coil and the outer core portion, one holding member being provided between one end surface of the coil and the outer core portion, the other holding member being provided between the other end surface of the coil and the outer core portion.

8. The reactor of claim 7, wherein the first and second pieces are in contact with the holding member.

9. The reactor of claim 8, wherein the holding member includes a first groove portion and a second groove portion, the first piece being fit into the first groove portion, the second piece being fit into the second groove portion.

10. The reactor of claim 1, wherein the assembly includes a resin molded portion for at least partially covering the outer core portion.

11. The reactor of claim 7, wherein:

the assembly includes a resin molded portion for at least partially covering the outer core portion, and the first and second pieces are in contact with the resin molded portion.

12. The reactor of claim 11, wherein the resin molded portion includes a first groove portion and a second groove portion, the first piece being fit into the first groove portion, the second piece being fit into the second groove portion.

13. The reactor of claim 1, wherein:

the screw member includes a shaft portion and a head portion, and a head accommodating portion for accommodating the entire head portion is provided in a surface of the bottom plate portion outward of the case.

14. The reactor of claim 1, wherein:

the case includes a facing surface on an inner peripheral surface of the case, the facing surface being on a side opposite to a side where the grip member is arranged, and a pressing portion projecting inwardly of the case from a position of the facing surface on the opening side, and the pressing portion is facing a surface of the assembly on the opening side.

15. The reactor of claim 1, wherein the second piece includes a screw hole, the screw member being screwed into the screw hole.

16. The reactor of claim 15, wherein the second piece includes a reinforcing portion for making a part near the screw hole thicker than other parts.

17. The reactor of claim 16, wherein the reinforcing portion is formed by a nut welded to the second piece.

18. The reactor of claim 16, wherein:

the bottom plate portion includes a slide recess for accommodating the reinforcing portion slidably toward the side opposite to the side where the grip member is arranged, and the reinforcing portion is fixed by the screw member at a position in an end part of the slide recess.

19. The reactor of claim 1, comprising a sealing resin to be filled into the case.

* * * * *